(12) United States Patent
Depondt (10) Patent No.: US 11,007,982 B2
(45) Date of Patent: May 18, 2021

(54) WIPER DEVICE (71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 16/063,654

(22) PCT Filed: Dec. 2, 2016

(86) PCT No.: PCT/EP2016/079530
§ 371 (c)(1),
(2) Date: Jun. 18, 2018

(87) PCT Pub. No.: WO2017/102371
PCT Pub. Date: Jun. 22, 2017

(65) Prior Publication Data
US 2020/0269819 A1 Aug. 27, 2020

(30) Foreign Application Priority Data
Dec. 18, 2015 (DE) ...................... 10 2015 225 889.0

(51) Int. Cl.
*B60S 1/40* (2006.01)
(52) U.S. Cl.
CPC ........... *B60S 1/4045* (2013.01); *B60S 1/4048* (2013.01); *B60S 2001/4051* (2013.01); *B60S 2001/4058* (2013.01)
(58) Field of Classification Search
CPC .... B60S 1/4038; B60S 1/4045; B60S 1/4048; B60S 1/40; B60S 2001/4058; B60S 2001/4061; B60S 2001/4051
(Continued)

(56) References Cited

U.S. PATENT DOCUMENTS 5,383,248 A    1/1995  Ho
6,599,051 B1 *  7/2003  Jarasson ............... B60S 1/4038
                                                    15/250.32
(Continued)

FOREIGN PATENT DOCUMENTS

CN           1736776 A       2/2006
CN         201998951 U      10/2011
(Continued)

OTHER PUBLICATIONS

International Search Report for Application No. PCT/EP2016/079530 dated Mar. 10, 2017 (English Translation, 2 pages).

*Primary Examiner* — Gary K. Graham
(74) *Attorney, Agent, or Firm* — Michael Best & Friedrich LLP (57) ABSTRACT

The invention relates to a wiper device (10) comprising a wiper blade adapter (12) having at least one first wiper blade adapter element (14) and at least one second wiper blade adapter element (16), which mounted such that it can pivot relative to the first wiper blade adapter element (14) in at least one mounted state, and comprising a wiper arm adapter (18), which is coupled to the second wiper blade adapter element (16) in the mounted state. According to the invention, the wiper blade adapter (12) has a security unit (20), which is provided to allow a removal of the wiper arm adapter (18) from the wiper blade adapter (12) exclusively in at least one removal pivot position of the wiper arm adapter (18) relative to the first wiper blade adapter element (14).

13 Claims, 8 Drawing Sheets (58) Field of Classification Search
USPC .................................................. 15/250.32
See application file for complete search history.

(56) References Cited

U.S. PATENT DOCUMENTS

| | | | | |
|---|---|---|---|---|
| 8,549,696 | B2 * | 10/2013 | Boland | B60S 1/40 |
| | | | | 15/250.32 |
| 9,573,568 | B2 * | 2/2017 | Egner-Walter | B60S 1/4048 |
| 9,845,076 | B2 * | 12/2017 | Caillot | B60S 1/3868 |
| 10,081,338 | B2 * | 9/2018 | Schmid | B60S 1/42 |
| 2011/0113583 | A1 | 5/2011 | Subramaniam et al. | |

FOREIGN PATENT DOCUMENTS

| | | | |
|---|---|---|---|
| CN | 103101516 A | | 5/2013 |
| CN | 104512380 A | | 4/2015 |
| CN | 104554173 A | | 4/2015 |
| DE | 202010017467 | * | 6/2012 |
| DE | 102012021472 | * | 5/2013 |
| DE | 102011057118 | * | 7/2013 |
| DE | 102013019805 | | 5/2015 |
| WO | 2004098962 | | 11/2004 |

* cited by examiner

WIPER DEVICE

BACKGROUND OF THE INVENTION

A wiper device comprising a wiper blade adapter unit which has a first wiper blade adapter element and a second wiper blade adapter element has already been proposed. In a mounted state, the second wiper blade adapter element is fastened pivotably to the first wiper blade adapter element and partially engages around the first wiper blade adapter element. In the mounted state, the first wiper blade adapter element is fastened to a component of a wiper blade. In the mounted state, the second wiper blade adapter element is coupled to a wiper arm adapter. The wiper arm adapter is removed from the wiper blade adapter in an operating position. For the removal, the wiper arm adapter is moved in the operating position in a horizontal direction, which is oriented parallel to a window to be wiped, relative to the wiper blade adapter, in particular relative to the first wiper blade adapter element and to the second wiper blade adapter element.

SUMMARY OF THE INVENTION

The invention is based on a wiper device comprising a wiper blade adapter which has at least one first wiper blade adapter element, which is provided in particular for connecting, in particular for directly and/or indirectly connecting, to at least one wiper blade component, in particular to at least one spring rail, and has at least one second wiper blade adapter element which, in at least one mounted state, is mounted pivotably relative to the first wiper blade adapter element and which, in particular in the mounted state, at least partially engages around the first wiper blade adapter element, and comprising a wiper arm adapter which, in the mounted state, is coupled to the second wiper blade adapter element.

It is proposed that the wiper blade adapter has a securing unit which is provided to permit removal of the wiper arm adapter from the wiper blade adapter exclusively in at least one removal pivoted position of the wiper arm adapter relative to the first wiper blade adapter element. A "wiper device" is intended to be understood as meaning in particular at least one part, in particular a subassembly, of a wiper, wherein in particular accessory units for the wiper can additionally also be included, for example a spray unit and/or a washing water duct. In particular, the wiper device can also include the entire wiper. In this connection, a "wiper blade adapter" is intended to be understood as meaning in particular an adapter which has a contact region with a wiper blade component and is connected captively to the wiper blade component and is provided for supplying a coupling region of the wiper blade component for coupling and/or contact connection to a wiper arm adapter. The wiper blade component could be, for example, a spring rail and/or a spoiler unit and/or an end cap unit and/or a wiper strip unit. A "wiper blade adapter element" is intended to be understood as meaning in particular a component of a wiper blade adapter that, in particular in at least one removed state, is movable, in particular freely movable, relative to a further component of the wiper blade adapter. The first wiper blade adapter element is provided in particular for coupling to the wiper blade component and in particular has at least one coupling region for coupling to the wiper blade component. In particular, the first wiper blade adapter element is provided to be coupled captively to the wiper blade component in the mounted state. For example, the first wiper blade adapter element could be provided for coupling to the wiper blade component via a welding connection and/or via an ultrasonic welding connection and/or via a latching connection. The first wiper blade adapter element in particular has at least one bearing pin which is provided for pivotably mounting the second wiper blade adapter element on the first wiper blade adapter element. The second wiper blade adapter element is provided in particular to be coupled captively to the first wiper blade adapter element in the mounted state. In the mounted state, the second wiper blade adapter element is coupled and/or arranged in particular pivotably to and/or on the bearing pin of the first wiper blade adapter element and is in particular mounted pivotably about a pivot axis, which runs through the bearing pin, relative to the first wiper blade adapter element. In the mounted state, the first wiper blade adapter element is at least partially arranged within the second wiper blade adapter element and/or is at least partially engaged around and/or surrounded by the second wiper blade adapter element. In this connection, a "wiper arm adapter" is intended to be understood as meaning in particular an adapter which has a contact region with a wiper arm component and is connected captively to the wiper arm component and is provided for supplying a coupling region of the wiper arm component for coupling and/or contact connection to a wiper blade adapter, in particular to a wiper blade adapter element of the wiper blade adapter. In the mounted state, the second wiper blade adapter element is in particular coupled to the wiper arm adapter. In particular, in the mounted state, the wiper arm adapter is coupled to the second wiper blade adapter element for rotation therewith and, in particular because of the coupling of the wiper arm adapter to the second wiper blade adapter element for rotation therewith, is mounted pivotably relative to the first wiper blade adapter element. A "securing unit" is intended to be understood as meaning in particular a unit which is provided for at least substantially preventing an in particular inadvertent removal of the wiper arm adapter from the wiper blade adapter and/or for permitting removal of the wiper arm adapter from the wiper blade adapter exclusively in at least one removal pivoted position of the wiper arm adapter relative to the first wiper blade adapter element and advantageously for at least substantially blocking and/or preventing same in pivoted positions, which are different from the removal pivoted position, of the wiper arm adapter relative to the first wiper blade adapter element. A "pivoted position" of an object, in particular of the second wiper blade adapter element and/or of the wiper arm adapter, relative to the first wiper blade adapter element is intended to be understood as meaning in particular a relative position of the object relative to the first wiper blade adapter element, which position is defined by at least one minimum angle of a main direction of extent of the object relative to a base area of the first wiper blade adapter element. In the removal pivoted position, the main direction of extent of the second wiper blade adapter element and/or of the wiper arm adapter oriented obliquely relative to the base area and encloses in particular a minimum angle of greater than 0° and less than 90°, in particular greater than 4° and less than 86°, with the base area. A "main direction of extent" of an object is intended to be understood as meaning in particular a direction which is oriented parallel to a longest side of a smallest imaginary geometrical cuboid which precisely surrounds the object. The first wiper blade adapter element in particular has at least one basic body which defines the base area and on which in particular the bearing pin is arranged. The base area is in particular a surface of the first wiper blade adapter element that, in at least one operating position, is oriented at least substantially parallel to a window to be wiped. An "operating position" is intended to be understood as meaning in particular a pivoted position of the second wiper blade adapter element and of the wiper arm adapter, which is coupled to the second wiper blade adapter element, relative to the first wiper blade adapter element, in which pivoted position a wiper strip is movable over a window to be wiped, in particular for cleaning purposes. In the operating position, the wiper device and in particular a wiper comprising the wiper device is in an operationally ready state. In particular, the removal pivoted position differs from the operating position. "Provided" is intended to be understood as meaning in particular specially designed and/or equipped. An object being provided for a certain function is intended to be understood as meaning in particular that the object carries out and/or implements said certain function in at least one use state and/or operating state.

A high degree of security can advantageously be provided by the configuration according to the invention of the wiper device. In particular, undesired and/or inadvertent removal of the wiper arm adapter from the wiper blade adapter can be at least substantially prevented.

Furthermore, it is proposed that the first wiper blade adapter element has at least one blocking element which, in the mounted state, at least partially reaches through the second wiper blade adapter element, in particular through a recess of the second wiper blade adapter element, and which is provided to block removal of the wiper arm adapter from the wiper blade adapter at least in one direction, in particular in at least one horizontal direction, and in particular to block a movement of the wiper arm adapter relative to the wiper blade adapter in the direction, in particular in the horizontal direction, in at least one operating positon of the wiper arm adapter relative to the first wiper blade adapter element. The blocking element is arranged in particular on the basic body of the first wiper blade adapter element. In particular, the blocking element has a main direction of extent which is oriented at least substantially perpendicularly to the base area. The blocking element in particular projects beyond the base area. In particular, the blocking element is part of the securing unit, said part being in particular partially formed by the first wiper blade adapter element. In particular, the securing unit is at least partially formed by the first wiper blade adapter element. In particular, the wiper arm adapter has at least one stop element which is provided to strike against the blocking element during an attempt to remove the wiper arm adapter from the wiper blade adapter in the direction. In particular, the direction is in the form of a horizontal direction. The direction, in particular the horizontal direction, is in particular oriented at least substantially parallel to the base area of the first wiper blade adapter element and/or to the window to be wiped. As a result, in particular removal of the wiper arm adapter from the wiper blade adapter in the operating position and, associated therewith, in an operating state, in particular an undesired and/or inadvertent removal, for example due to movements occurring in an operating state, can be prevented.

In the removal pivoted position, the wiper arm adapter is in particular pivoted relative to the blocking element. In the removal pivoted position, the wiper arm adapter is preferably in a removal position relative to the second wiper blade adapter element and, starting from the removal position, is arranged so as to be movable, in particular displaceable, at least in sections relative to the second wiper blade adapter element. In particular, in the removal pivoted position, starting from the removal position, the wiper arm adapter is arranged so as to be movable by a distance of at least 3 mm, in particular of at least 4 mm, advantageously of at least 5 mm and preferably of at least 6 mm, relative to the second wiper blade adapter element. As a result, in particular removal of the wiper arm adapter from the wiper blade adapter can be at least initiated and/or a high degree of flexibility can be provided.

Furthermore, it is proposed that the blocking element has at least one guide surface which, in the removal pivoted position, is provided for guiding the wiper arm adapter, in particular the stop element of the wiper arm adapter, relative to the second wiper blade adapter element, in particular during a movement of the wiper arm adapter from the removal position into a further removal position. In particular, during the movement of the wiper arm adapter relative to the second wiper blade adapter element, the wiper arm adapter slides over the guide surface and/or in contact with the guide surface. In particular, the guide surface is oriented obliquely relative to the base area and is designed in particular as a surface of the blocking element that faces away from the base area. The blocking element and in particular the guide surface is/are preferably provided to at least substantially block and/or prevent a movement of the wiper arm adapter relative to the first wiper blade adapter element back into the operating position at least in the further removal position and in particular additionally in positions of the movement of the wiper arm adapter relative to the second wiper blade adapter element, in which positions the wiper arm adapter is arranged above the guide surface and/or in contact with the guide surface. As a result, in particular a particularly advantageous movement of the wiper arm adapter relative to the second wiper blade adapter element can be achieved.

For example, in the removal pivoted position, the wiper arm adapter, starting from the removal position, could be removed from the second wiper blade adapter element and therefore from the wiper blade adapter by the movement, in particular by the displacement, relative to the second wiper blade adapter element. The second wiper blade adapter element preferably has at least one limiting element which is provided to limit a movement, which takes place in the removal pivoted position, of the wiper arm adapter relative to the second wiper blade adapter element and in particular to define the further removal position by means of said limiting. In particular, the securing unit is at least partially formed by the second wiper blade adapter element. In particular, upon an attempt to continue the movement of the wiper arm adapter relative to the second wiper blade adapter element, the stop element of the wiper arm adapter strikes against the limiting element. The movement of the wiper arm adapter relative to the second wiper blade adapter element is in particular directed onto the base area and in particular is at least substantially oriented parallel to the guide surface. As a result, in particular a high degree of security and/or a multi-stage removal process can be made possible.

In addition, it is proposed that the second wiper blade adapter element has at least one removal slotted guide mechanism which, in the removal pivoted position, in particular starting from the further removal position, is provided at least in sections for guiding at least one stop element of the wiper arm adapter. In this connection, a "slotted guide mechanism" is intended to be understood as meaning in particular a slotted track in which at least one stop element of a wiper arm adapter is inevitably guided in at least one plane. A transmission function of the slotted guide mechanism is determined exclusively by the course of the slotted track. The slotted track is preferably formed by a groove. In particular, the wiper arm adapter is removed from the wiper blade adapter by a movement of the stop element in a removal direction relative to the second wiper blade adapter element. The removal direction is in particular oriented at least substantially perpendicularly to the guide surface. The removal slotted guide mechanism is in particular defined and/or formed by the second wiper blade adapter element and has in particular at least one slotted guide mechanism base area. In this connection, a "slotted guide mechanism base area" is intended to be understood as meaning in particular an area of a slotted guide mechanism that is bounded by side walls provided to form an inevitable lateral guide for a guide slot. As a result, in particular an optimum direction of movement of the wiper arm adapter relative to the second wiper blade adapter element can be predetermined and/or a high degree of convenience can be obtained.

In the removal pivoted position, the wiper arm adapter could adopt, for example, a minimum angle of maximally 50°, in particular of maximally 40°, advantageously of maximally 30° and preferably of maximally 25° relative to the base area of the first wiper blade adapter element. In the removal pivoted position, the wiper arm adapter preferably adopts a minimum angle of at least 5°, in particular of at least 7°, advantageously of at least 9° and preferably of at least 10° relative to a base area of the first wiper blade adapter element. As a result, in particular, a particularly high degree of security can be achieved.

Furthermore, it is proposed that the wiper device has at least one mounting slotted guide mechanism which is at least partially formed by the second wiper blade adapter element and which, in particular in the event of mounting the wiper arm adapter on the second wiper blade adapter element, is provided at least in sections for guiding at least one stop element of the wiper arm adapter. In particular, mounting of the wiper arm adapter on the second wiper blade adapter element can be carried out independently of a pivoted position of the second wiper blade adapter element relative to the first wiper blade adapter element. In particular, the mounting of the wiper arm adapter on the second wiper blade adapter element can be carried out in the removal pivoted position and in the operating position of the second wiper blade adapter element relative to the first wiper blade adapter element. As a result, in particular, erroneous mounting can be avoided and/or simple mounting of the wiper arm adapter on the second wiper blade adapter element can be achieved.

For example, the mounting slotted guide mechanism could be formed at least for the most part, for example at least substantially and in particular completely, by the second wiper blade adapter element. The mounting slotted guide mechanism is advantageously at least partially formed by the first wiper blade adapter element, in particular by the blocking element and advantageously by a lateral limiting of the blocking element. In particular in the event of mounting of the wiper arm adapter on the second wiper blade adapter element, the blocking element is preferably provided at least in sections for guiding at least one stop element of the wiper arm adapter.

In particular, the second wiper blade adapter element has at least one slotted guide mechanism limiting element which in particular at least partially limits the mounting slotted guide mechanism and in particular forms a lateral wall at least partially limiting the mounting slotted guide mechanism. The slotted guide mechanism limiting element and the blocking element are advantageously arranged at least substantially flush at least in the operating position. This makes it possible for the blocking element in particular to take on a plurality of functions, as a result of which in particular low costs can be achieved and/or further elements, which could be provided in particular for carrying out a limiting function for the mounting slotted guide mechanism, can be dispensed with.

The mounting slotted guide mechanism and the removal slotted guide mechanism could be arranged, for example, spaced apart and/or separated from each other. The mounting slotted guide mechanism and the removal slotted guide mechanism are advantageously arranged adjacent. The second wiper blade adapter element preferably has at least one slotted guide mechanism limiting element which is provided to at least partially, in particular laterally, limit the mounting slotted guide mechanism and the removal slotted guide mechanism. The mounting slotted guide mechanism and the removal slotted guide mechanism are advantageously arranged at least substantially parallel. As a result, in particular a compact and/or reasonably priced and/or material-saving configuration can be made possible.

A particularly high degree of security can be achieved by a wiper comprising at least one wiper device according to the invention.

In the case of a wiper blade adapter for a wiper device according to the invention which is provided and/or designed in particular specifically for the wiper device according to the invention, the degree of security can be increased even further.

Particularly reliable removal of the wiper arm adapter from the wiper blade adapter can be achieved by a method for removing a wiper device according to the invention, comprising a wiper blade adapter which has at least one first wiper blade adapter element and at least one second wiper blade adapter element, which, in at least one mounted state, is mounted so as to be pivotable relative to the first wiper blade adapter element, and comprising a wiper arm adapter which, in the mounted state, is coupled to the second wiper blade adapter element, wherein removal of the wiper arm adapter from the wiper blade adapter is permitted exclusively in at least one removal pivoted position of the wiper arm adapter relative to the first wiper blade adapter element.

The wiper device according to the invention is not intended to be limited here to the above-described use and embodiment. In particular, the wiper device according to the invention can have a number deviating from a number mentioned here of individual elements, components and units for carrying out an operation described here.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and combine them into meaningful further combinations.

In the drawing.

DETAILED DESCRIPTION

Figure 1:
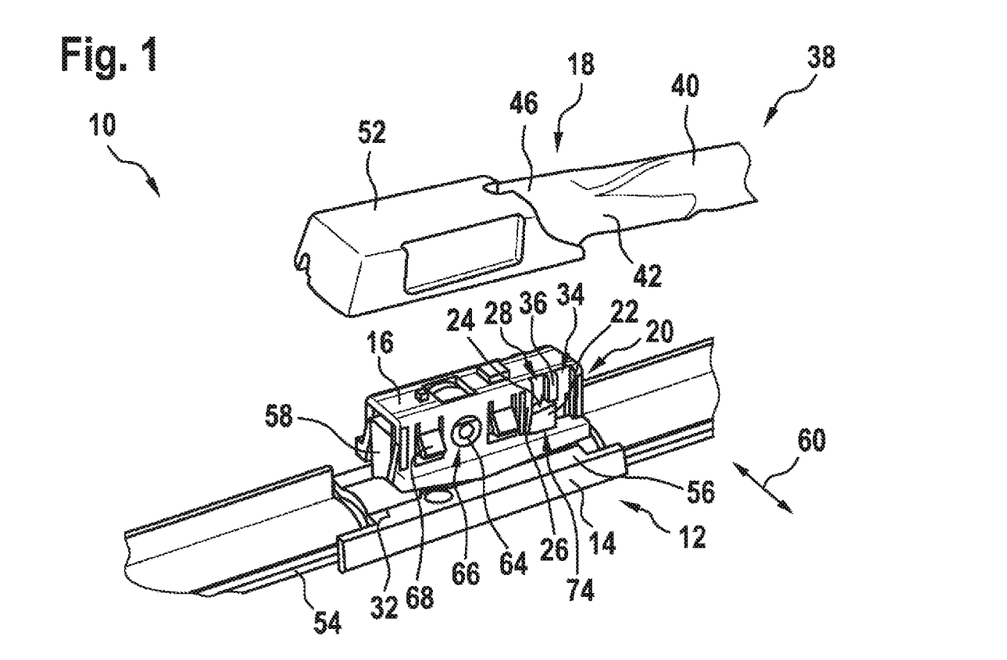
FIG. 1 shows a schematic perspective illustration of a wiper according to the invention comprising a wiper device according to the invention.

FIG. 1 shows a wiper 38 comprising a wiper device 10. The wiper device 10 has a wiper blade 54. The wiper blade 54 has at least one spring rail (not illustrated). The wiper blade 54 has a wiper strip which, in an operating position, is arranged in contact with a window to be wiped (not illustrated). In a mounted state, the spring rail and the wiper strip are connected to each other. The wiper blade 54 has a spoiler unit which presses the wiper blade 54 in the operating position and in an operating state onto the window to be wiped. The wiper blade 54 forms a flat wiper blade.

The wiper device 10 has a wiper arm adapter 18. The wiper arm adapter 18 has a wiper arm adapter element 40. The wiper arm adapter element 40 has a U-shaped profile. The wiper arm adapter element 40 has two side flanges 42, 44 which are connected on the top side by a flat web 46. The side flanges 42, 44 run substantially parallel to each other. The web 46 runs substantially perpendicular to the side flanges 42, 44.

The wiper arm adapter 18 has four recesses 48, 50. The recesses 48, 50 are arranged on the wiper arm adapter element 40. Two of the recesses 48, 50 are in each case arranged on one of the side flanges 42, 44. The recesses 48, 50 substantially, in particular completely, penetrate the side flanges 42, 44. The recesses 48, 50 open the side flanges 42, 44 in a direction facing the wiper blade adapter.

The wiper arm adapter 12 has a securing element 52. In the mounted state, the securing element 52 is mounted displaceably on the wiper arm adapter element 40. In the mounted state, the securing element 52 is mounted in a linearly displaceable manner on the wiper arm adapter element 40. The securing element 52 has a U-shaped profile. In the mounted state, the securing element 52 partially engages around the wiper arm adapter element 40. The securing element 52 partially covers the side flanges 42, 44 of the wiper arm adapter element 40 and the web 46 of the wiper arm adapter element 40 in the mounted state.

The wiper device 10 has a wiper blade adapter 12. The wiper blade adapter 12 is designed specifically for the wiper device 10. The wiper blade adapter 12 is provided for releasable coupling to the wiper arm adapter 18. In the mounted state, the wiper blade adapter 12 is connected captively to the wiper blade 54.

Figure 3:
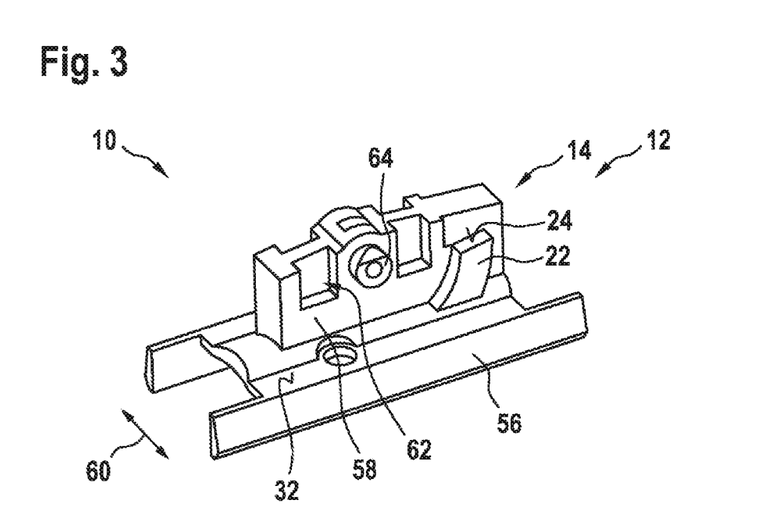
FIG. 3 shows a schematic perspective illustration of a first wiper blade adapter element of the wiper blade adapter.

The wiper blade adapter 12 has a first wiper blade adapter element 14 (cf. FIG. 3). The first wiper blade adapter element 14 is formed integrally. The first wiper blade adapter element 14 has a basic body 56. In the mounted state, the basic body 56 is fixedly connected to the wiper blade 54, for example by a welding connection, in particular an ultrasonic welding connection, or else by a latching connection. The first wiper blade adapter element 14 has a base area 32.

The basic body 56 has a retaining wall 58 running perpendicularly to a wiping direction 60. The wiping direction 60 runs substantially perpendicularly to a main direction of extent of the wiper arm adapter 18. The wiping direction 60 runs substantially parallel to a window to be wiped.

The retaining wall 58 extends substantially perpendicularly to the base area 32 and in particular projects beyond the base area 32. Four recesses 62 are arranged in the retaining wall 58. Of multiple objects present, only one is provided with a reference sign in each of the figures. The recesses 62 partially penetrate the retaining wall 58.

The first wiper blade adapter element 14 has a bearing pin 64. The bearing pin 64 is arranged on the basic body 56. The bearing pin 64 is formed integrally with the basic body 56. The bearing pin 64 is of substantially cylindrical design. A cylinder axis of the bearing pin 64 runs substantially parallel to the wiping direction 60.

Figure 2:
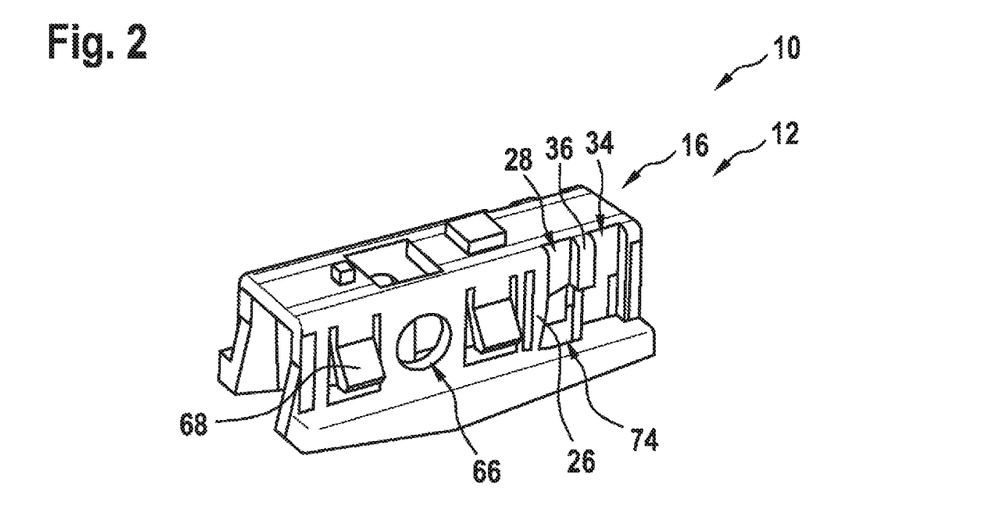
FIG. 2 shows a schematic perspective illustration of a second wiper blade adapter element of a wiper blade adapter of the wiper device.

The wiper blade adapter 12 has a second wiper blade adapter element 16 (cf. FIG. 2). The second wiper blade adapter element 16 is formed integrally. In the mounted state, the second wiper blade adapter element 16 partially engages around the first wiper blade adapter element 14. The second wiper blade adapter element 16 has a substantially U-shaped profile.

In the mounted state, the second wiper blade adapter element 16 is mounted pivotably relative to the first wiper blade adapter element 14. In the mounted state, the second wiper blade adapter element 16 is mounted pivotably about the cylinder axis of the bearing pin 64. The second wiper blade adapter element 16 has two recesses 66. In the mounted state, the bearing pin 64 of the first wiper blade adapter element 14 partially reaches through the recesses 66 of the second wiper blade adapter element 16 (cf. FIG. 1).

The second wiper blade adapter element 16 is provided to be pushed into the wiper arm adapter element 40 during mounting. In the mounted state, the wiper arm adapter 18 is coupled to the second wiper blade adapter element 16.

Figure 8:
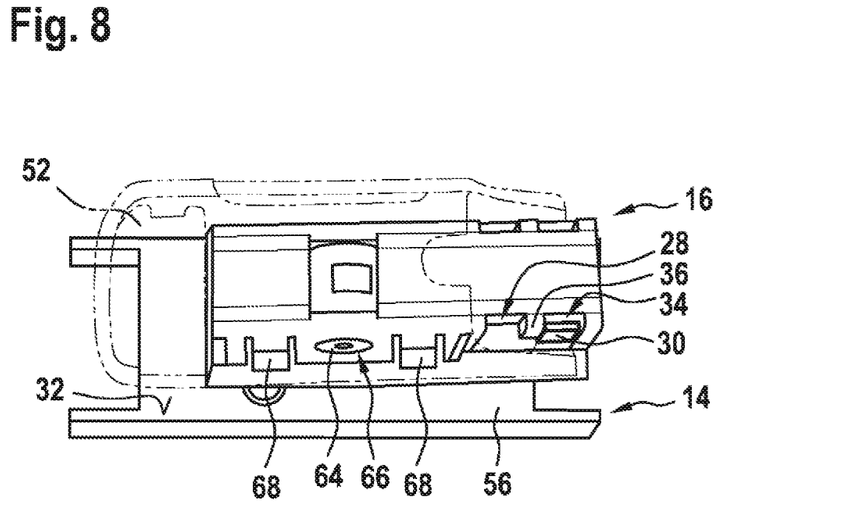
FIG. 8 shows a schematic illustration from above of the wiper blade adapter and the wiper arm adapter, which is partially illustrated transparently, in the mounted state.

The wiper blade adapter 12 and the wiper arm adapter 18 are formed substantially symmetrically with respect to a plane of symmetry (cf. FIG. 8), and therefore only one side of the plane of symmetry is described below. The plane of symmetry is oriented substantially perpendicularly to the base area 32 of the first wiper blade adapter element 14. Alternatively to a symmetrical configuration of the wiper blade adapter and of the wiper arm adapter, the described objects could be arranged exclusively on one side of the wiper blade adapter and/or of the wiper arm adapter.

The second wiper blade adapter element 16 has two latching means 68. The latching means 68 are provided to be latched to the securing element 52 of the wiper arm adapter 18 during mounting. The latching means 68 are designed to be deflectable in a spring-elastic manner out of a starting position. The latching means 68 each form a latching tongue. The latching means 68 are designed to be elastically deflectable in the wiping direction 60. In the mounted state, the latching means 68 partially engage in the recesses 48, 50 of the wiper arm adapter element 40.

Figure 4:
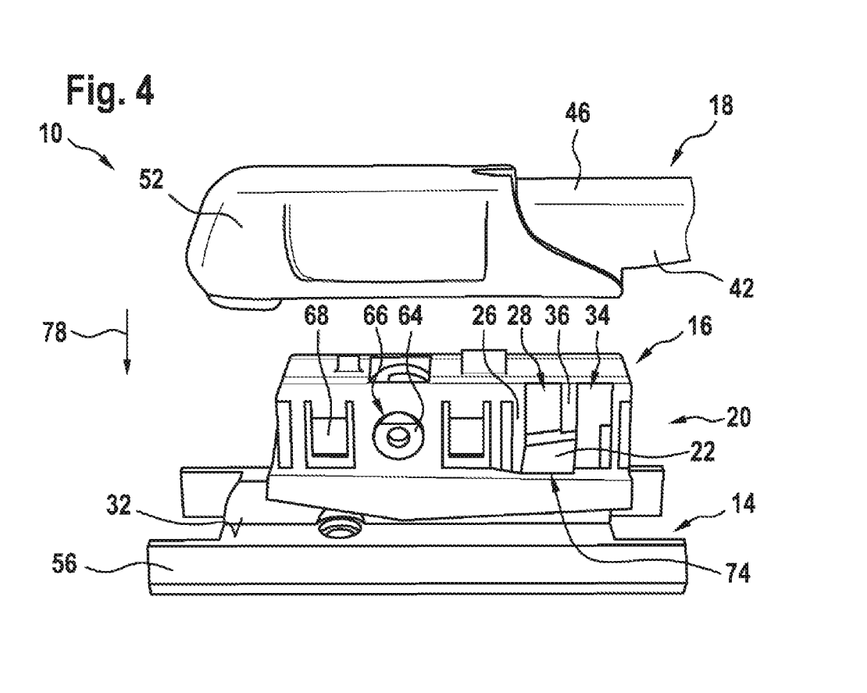
FIG. 4 shows a schematic perspective illustration of the wiper blade adapter and a wiper arm adapter of the wiper device in a first mounting position.
Figure 5:
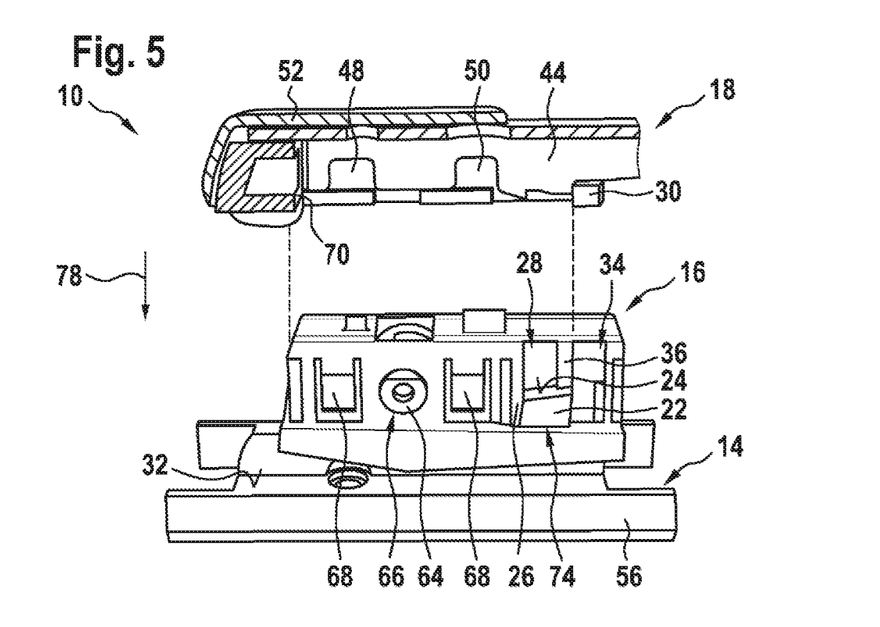
FIG. 5 shows a schematic perspective illustration of the wiper blade adapter and part of the wiper arm adapter in a second mounting position.

For mounting of the wiper arm adapter 18 on the wiper blade adapter 12, the wiper arm adapter 18 is arranged above the wiper blade adapter 12 (cf. FIG. 4). The wiper arm adapter 18 is moved toward the wiper blade adapter 12 in a mounting direction 78 (cf. FIGS. 4 to 7). The mounting direction 78 is oriented substantially perpendicularly to the window to be wiped in the operating position. In the operating position, the mounting direction 78 is oriented substantially perpendicularly to the base area 32 of the first wiper blade adapter element 14.

The wiper device 10 has a mounting slotted guide mechanism 34. The mounting slotted guide mechanism 34 is partially formed by the second wiper blade adapter element 16. For the mounting of the wiper arm adapter 18 on the wiper blade adapter 12, the mounting slotted guide mechanism 34 is provided in sections for guiding a stop element 30 of the wiper arm adapter 18.

The wiper arm adapter 18 has the stop element 30. The stop element 30 is arranged on the securing element 52. The stop element 30 is arranged in a region of the securing element 52 that faces the wiper arm adapter element 40. During the mounting of the wiper arm adapter 18 on the wiper blade adapter 12, the stop element 30 slides in the mounting direction 78 in the mounting slotted guide mechanism 34.

The wiper arm adapter 18 has a further stop element 70. The further stop element 70 is arranged on the securing element 52. The further stop element 70 is arranged in a region of the securing element 52 that faces away from the wiper arm adapter element 40. During the mounting of the wiper arm adapter 18 on the wiper blade adapter 12, the further stop element 70 slides in the mounting direction 78 along a front wall of the second wiper blade adapter element 16. The front wall of the second wiper blade adapter element 16 is arranged with respect to a main direction of extent of the second wiper blade adapter element 16 in a manner facing away from the wiper arm adapter element 40.

Figure 7:
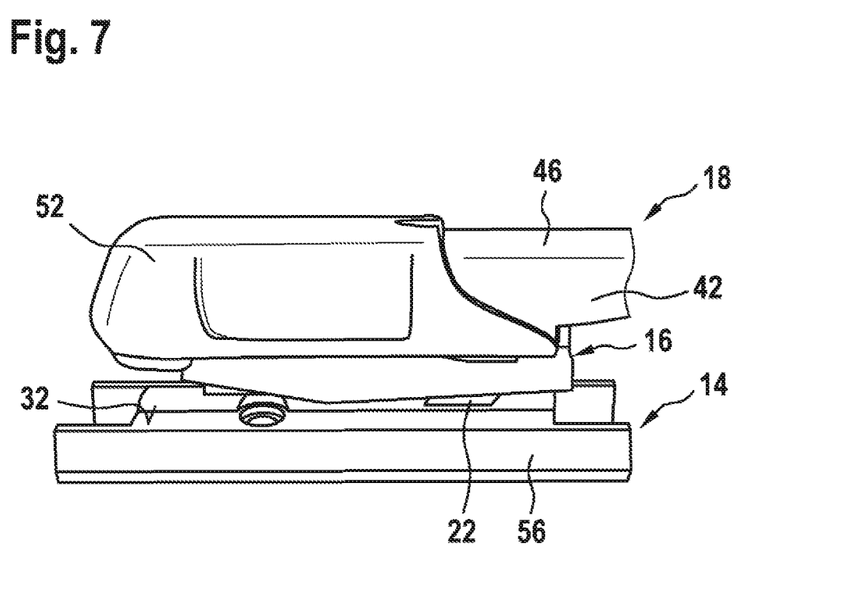
FIG. 7 shows a schematic perspective illustration of the wiper blade adapter and the wiper arm adapter in the mounted state.

During the mounting of the wiper arm adapter 18 on the wiper blade adapter 12, the wiper arm adapter 18 is moved toward the wiper blade adapter 12 until the latching means 68 engage in the recesses 48, 50 of the wiper arm adapter 18 (cf. FIG. 7). In the mounted state, the wiper arm adapter 18 and the second wiper blade adapter element 16 are latched to each other.

Figure 6:
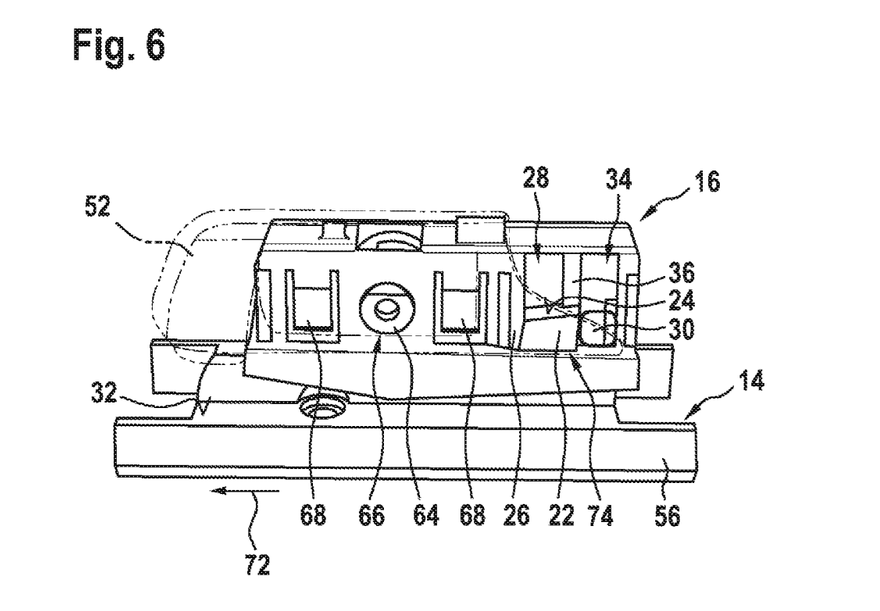
FIG. 6 shows a schematic perspective illustration of the wiper blade adapter and the wiper arm adapter, which is illustrated partially transparently, in a mounted state.

In the mounted state and in the operating position, the stop element 30 is arranged at an end of the mounting slotted guide mechanism 34 that faces the base area 32 of the first wiper blade adapter element 14 (cf. FIG. 6). In the operating position, a lateral limiting of the mounting slotted guide mechanism 34 prevents a movement of the wiper arm adapter 18 relative to the second wiper blade adapter element 16 in a direction 72 and therefore removal of the wiper arm adapter 18 from the wiper blade adapter 12 in the direction 72.

The first wiper blade adapter element 14 has a blocking element 22. The blocking element 22 partially forms the mounting slotted guide mechanism 34. The mounting slotted guide mechanism 34 is partially formed by the first wiper blade adapter element 14. The blocking element 22 forms the lateral limiting of the mounting slotted guide mechanism 34. When the wiper arm adapter 18 is mounted on the wiper blade adapter 12, the blocking element 22 is provided in sections for guiding the stop element 30 of the wiper arm adapter 18.

In the operating position of the wiper arm adapter 18 relative to the first wiper blade adapter element 14, the blocking element 22 blocks removal of the wiper arm adapter 18 from the wiper blade adapter 12 in the direction 72. The direction 72 is oriented substantially parallel to the window to be wiped. The direction 72 is embodied as the horizontal direction.

In the mounted state and in the operating position, the blocking element 22 partially reaches through the second wiper blade adapter element 16. The second wiper blade adapter element 16 has a recess 74 through which the blocking element 22 partially reaches in the mounted state and in the operating position.

The second wiper blade adapter element 16 has a slotted guide mechanism limiting element 36. The slotted guide mechanism limiting element 36 forms the lateral limiting of the mounting slotted guide mechanism 34. In the operating position, the slotted guide mechanism limiting element 36 and the blocking element 22 are arranged substantially flush.

In the mounted state, the wiper arm adapter 18 and the second wiper blade adapter element 16 are connected to each other for rotation with each other. The wiper arm adapter 18 is mounted pivotably relative to the first wiper blade adapter element 14.

Figure 9:
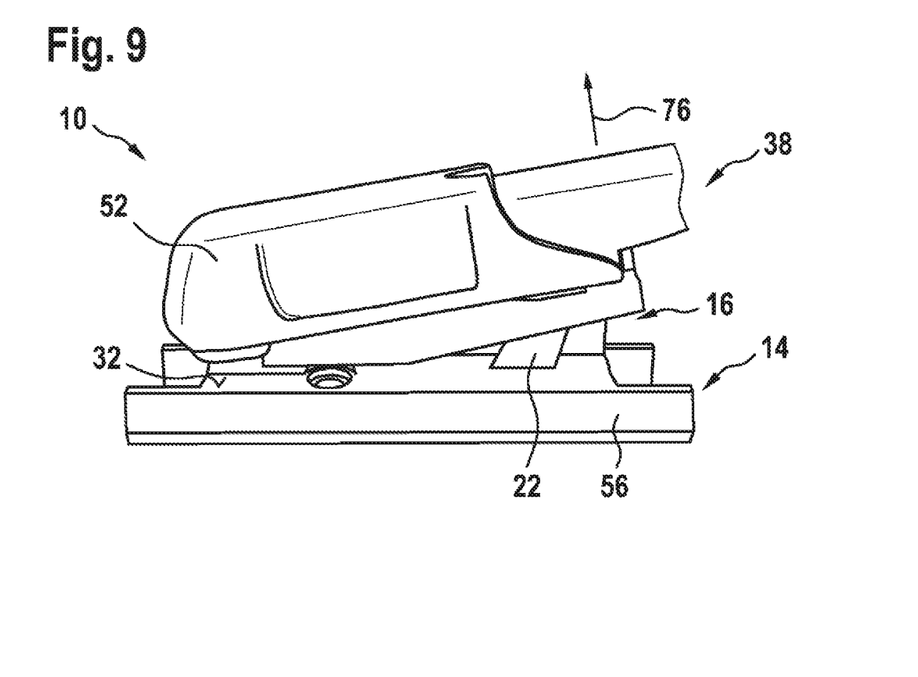
FIG. 9 shows a schematic perspective illustration of the wiper blade adapter and the wiper arm adapter in a removal pivoted position of the wiper blade adapter relative to the first wiper blade adapter element.
Figure 10:
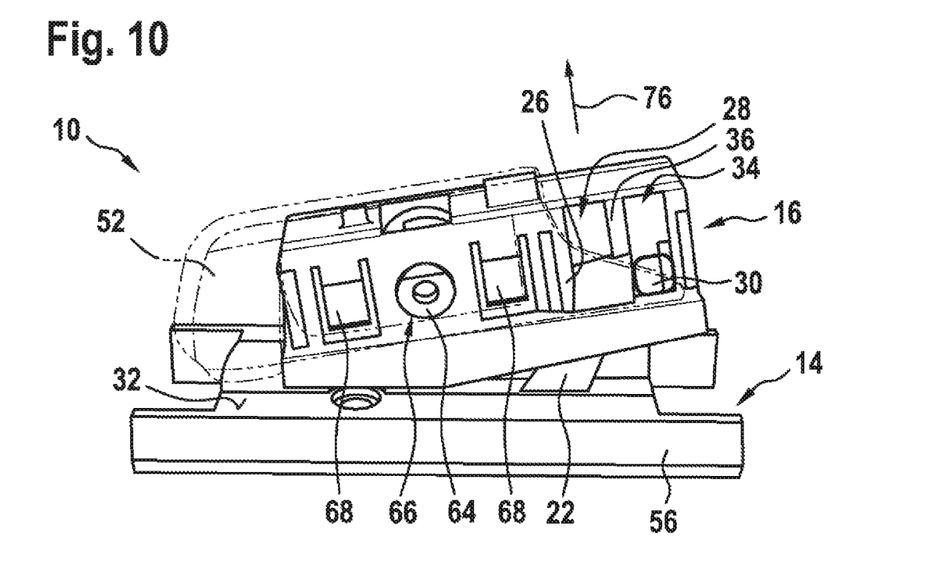
FIG. 10 shows a schematic perspective illustration of the wiper blade adapter and the wiper arm adapter, which is partially illustrated transparently, in the removal pivoted position, in a removal position of the wiper blade adapter relative to the second wiper blade adapter element.
Figure 11:
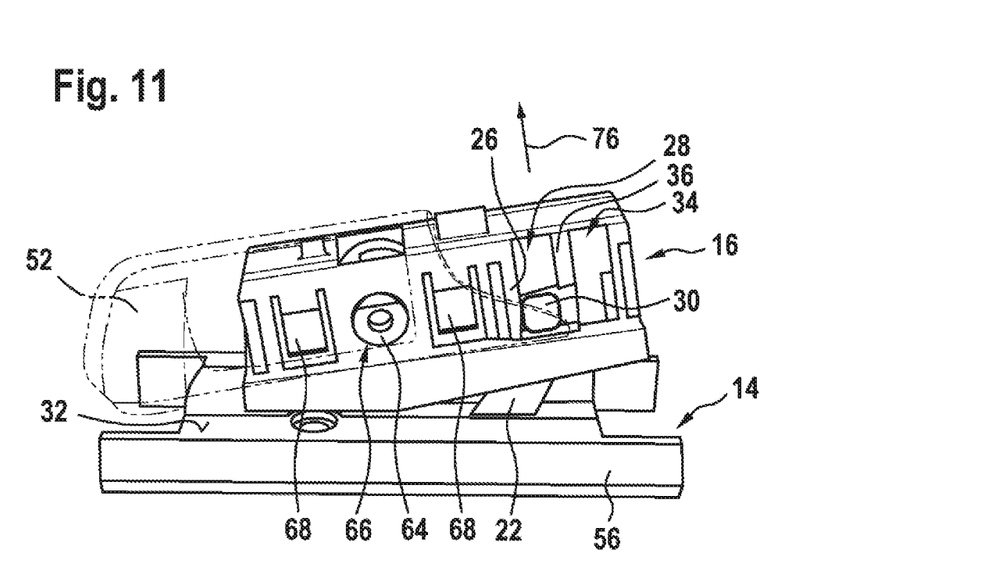
FIG. 11 shows a schematic perspective illustration of the wiper blade adapter and the wiper arm adapter, which is partially illustrated transparently, in the removal pivoted position, in a further removal position of the wiper blade adapter relative to the second wiper blade adapter element.
Figure 12:
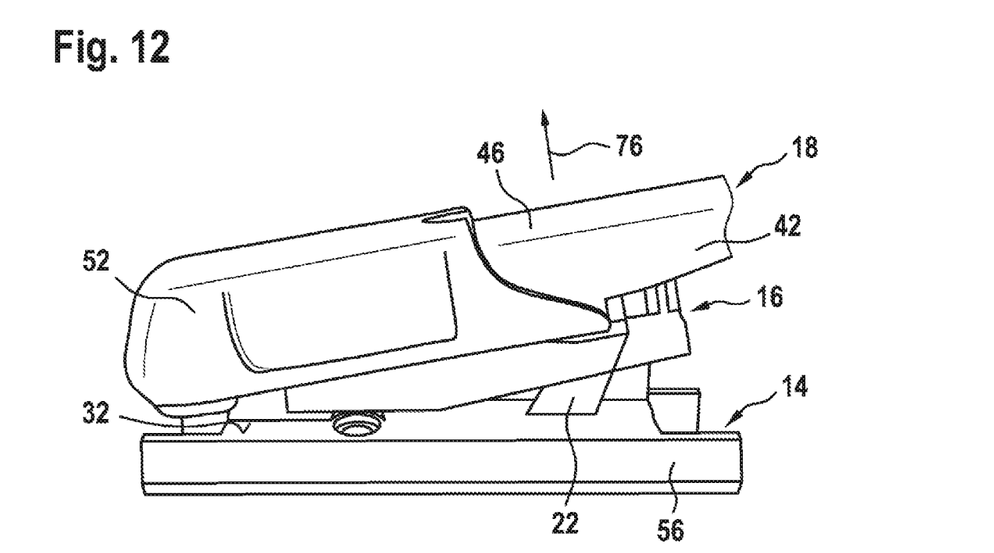
FIG. 12 shows a schematic perspective illustration of the wiper blade adapter and the wiper arm adapter in the removal pivoted position, in the further removal position.
Figure 13:
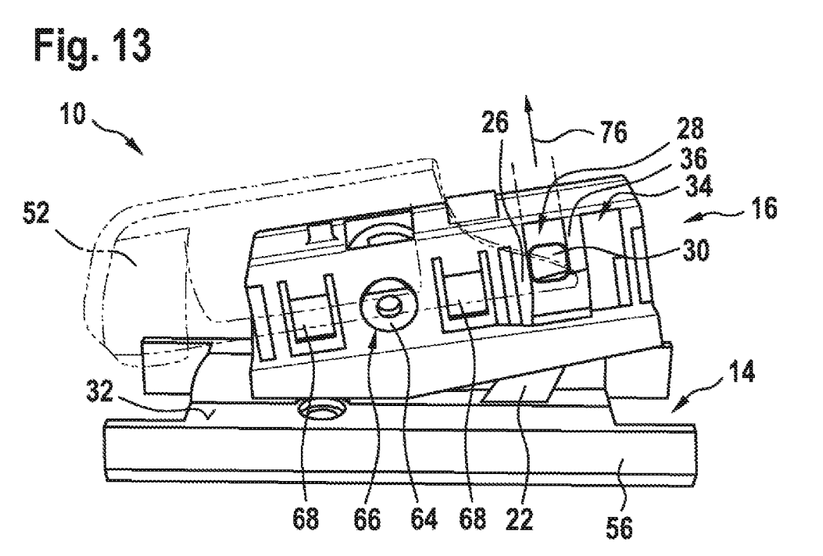
FIG. 13 shows a schematic perspective illustration of the wiper blade adapter and the wiper arm adapter, which is partially illustrated transparently, in the removal pivoted position in a first position of the wiper blade adapter relative to the second wiper blade adapter element.
Figure 14:
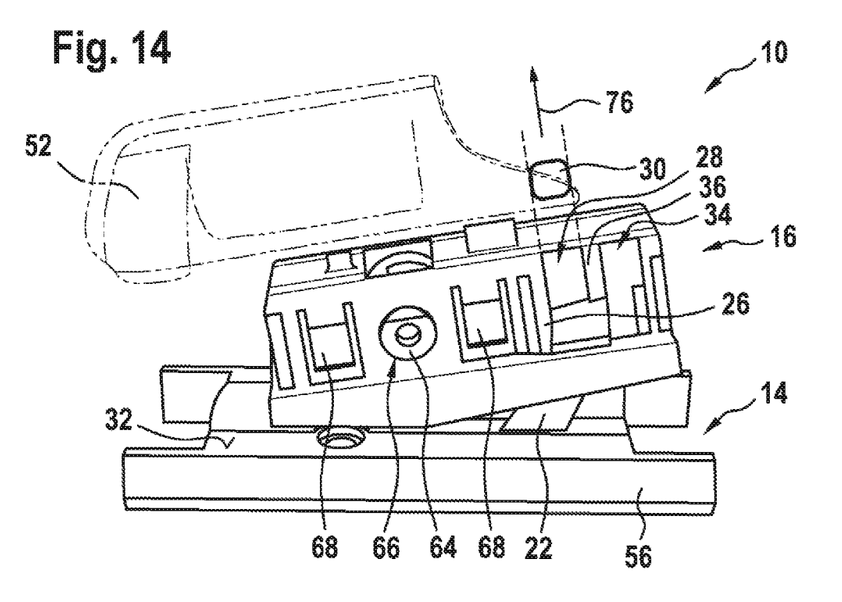
FIG. 14 shows a schematic perspective illustration of the wiper blade adapter and the wiper arm adapter, which is partially illustrated transparently, in the removal pivoted position in a second position of the wiper blade adapter relative to the second wiper blade adapter element.
Figure 15:
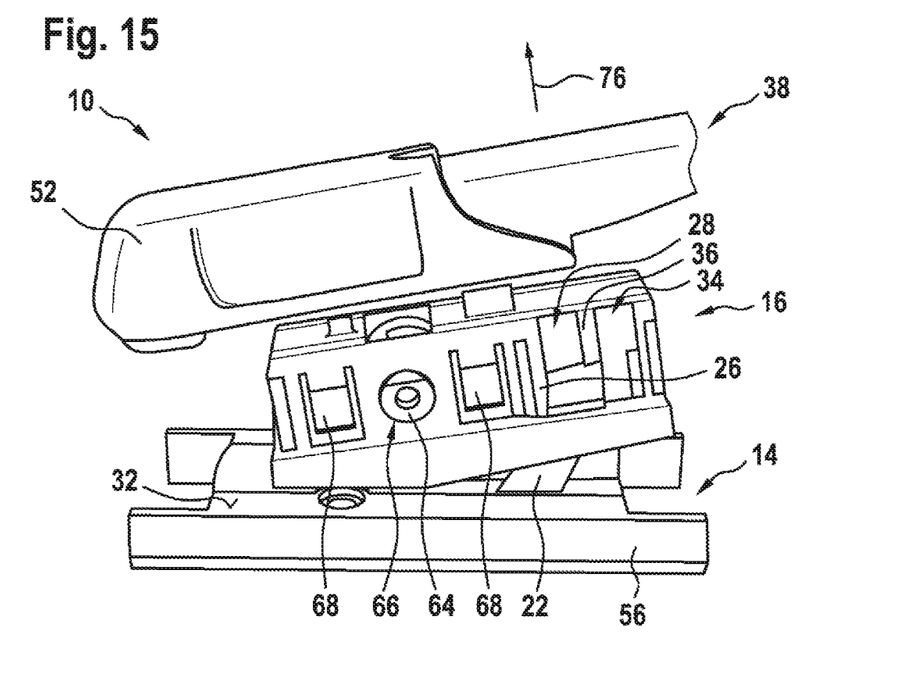
FIG. 15 shows a schematic perspective illustration of the wiper blade adapter and the wiper arm adapter in the removal pivoted position in the second position.

The wiper blade adapter 12 has a securing unit 20. The securing unit 20 permits removal of the wiper arm adapter 18 from the wiper blade adapter 12 exclusively in a removal pivoted position of the wiper arm adapter 18 relative to the first wiper blade adapter element 14 (cf. FIG. 9). The securing unit 20 is partially formed by the blocking element 22.

In a method for removing the wiper device 10, removal of the wiper arm adapter 18 from the wiper blade adapter 12 is permitted exclusively in the removal pivoted position of the wiper arm adapter 18 relative to the first wiper blade adapter element 14.

In the removal pivoted position, the wiper arm adapter 18 is arranged obliquely relative to the base area 32. In the present exemplary embodiment, in the removal pivoted position, the wiper arm adapter 18 adopts a minimum angle of essentially 10° relative to the base area 32 of the first wiper blade adapter element 14.

In the removal pivoted position, the wiper arm adapter 18 is arranged in a removal position relative to the second wiper blade adapter element 16. Starting from the removal position, the wiper arm adapter 18 is arranged so as to be movable in sections relative to the second wiper blade adapter element 16.

The blocking element 22 has a guide surface 24. Starting from the removal position, during a movement of the wiper arm adapter 18 relative to the second wiper blade adapter element 16, the wiper arm adapter 18 slides along the guide surface 24 (cf. FIGS. 9 to 12). During the movement of the wiper arm adapter 18 relative to the second wiper blade adapter element 16, the blocking element 22 is provided in sections for guiding the stop element 30 of the wiper arm adapter 18.

In the removal pivoted position, the guide surface 24 is provided for guiding the wiper arm adapter 18 relative to the second wiper blade adapter element 16. In the removal pivoted position, the blocking element 22 permits a movement of the wiper arm adapter 18 relative to the second wiper blade adapter element 16.

In the present exemplary embodiment, in the removal pivoted position, starting from the removal position, the wiper arm adapter 18 is arranged so as to be movable by a distance of essentially 6 mm relative to the second wiper blade adapter element 16.

The second wiper blade adapter element 16 has a limiting element 26. The limiting element 26 limits a movement, which takes place in the removal pivoted position, of the wiper arm adapter 18 relative to the second wiper blade adapter element 16 (cf. FIG. 11). The limiting element 26 forms a stop surface for the stop element 30. In a further removal position of the wiper arm adapter 18 relative to the second wiper blade adapter element 16, the wiper arm adapter 18 is arranged in contact with the guide surface 24 and with the limiting element 26.

Starting from the further removal position, the blocking element 22 blocks a pivoting movement of the wiper arm adapter 18 from the removal pivoted position into the operating position.

Starting from the further removal position, the wiper arm adapter 18 is arranged movably in a removal direction 76 (cf. FIGS. 12 to 15). The removal direction 76 is oriented substantially perpendicularly to the guide surface 24. The second wiper blade adapter element 16 has a removal slotted guide mechanism 28 which, in the removal pivoted position, is provided in sections for guiding the stop element 30 of the wiper arm adapter 18. The removal slotted guide mechanism 28 guides the stop element 30 during a movement in the removal direction 76.

The removal slotted guide mechanism 28 is partially limited by the slotted guide mechanism limiting element 36. The slotted guide mechanism limiting element 36 partially limits the mounting slotted guide mechanism 34 and the removal slotted guide mechanism 28.

What is claimed is:

1. A wiper device comprising a wiper blade adapter (12) which has at least one first wiper blade adapter element (14) and at least one second wiper blade adapter element (16), which, in at least one mounted state, is mounted so as to be pivotable relative to the at least one first wiper blade adapter element (14), and comprising a wiper arm adapter (18) which, in the mounted state, is coupled to the at least one second wiper blade adapter element (16), characterized in that the wiper blade adapter (12) has a securing unit (20) which is configured to permit removal of the wiper arm adapter (18) from the wiper blade adapter (12) exclusively in at least one removal pivoted position of the wiper arm adapter (18) relative to the at least one first wiper blade adapter element (14), wherein the at least one first wiper blade adapter element (14) has at least one blocking element (22) which, in the mounted state, at least partially reaches through the at least one second wiper blade adapter element (16) and which is configured to block removal of the wiper arm adapter (18) from the wiper blade adapter (12) at least in one direction (72) in at least one operating position of the wiper arm adapter (18) relative to the at least one first wiper blade adapter element (14), wherein the at least one second wiper blade adapter element (16) includes a recess (74), and wherein the at least one blocking element (22), in the mounted state, at least partially reaches through the recess (74).

2. The wiper device as claimed in claim 1, characterized in that, in the removal pivoted position, the wiper arm adapter (18) is arranged so as to be movable at least in sections relative to the at least one second wiper blade adapter element (16).

3. The wiper device as claimed in claim 1, characterized in that the at least one blocking element (22) has at least one guide surface (24) which, in the removal pivoted position, is configured for guiding the wiper arm adapter (18) relative to the at least one second wiper blade adapter element (16).

4. The wiper device as claimed in claim 3, characterized in that the at least one second wiper blade adapter element (16) has at least one limiting element (26) which is configured to limit a movement of the wiper arm adapter (18), which takes place in the removal pivoted position, relative to the at least one second wiper blade adapter element (16).

5. The wiper device as claimed in claim 1, characterized in that the at least one second wiper blade adapter element (16) has at least one removal slotted guide mechanism (28) which, in the removal pivoted position, is configured at least in sections for guiding at least one stop element (30) of the wiper arm adapter (18).

6. The wiper device at least as claimed in claim 5, characterized by at least one mounting slotted guide mechanism (34) which is at least partially formed by the at least one second wiper blade adapter element (16), wherein the at least one second wiper blade adapter element (16) has at least one slotted guide mechanism limiting element (36) which is configured to at least partially limit the mounting slotted guide mechanism (34) and the at least one removal slotted guide mechanism (28).

7. The wiper device as claimed in claim 1, characterized in that, in the removal pivoted position, the wiper arm adapter (18) adopts a minimum angle of at least 5° relative to a base area (32) of the at least one first wiper blade adapter element (14).

8. The wiper device as claimed in claim 1, characterized by at least one mounting slotted guide mechanism (34) which is at least partially formed by the at least one second wiper blade adapter element (16) and which is configured at least in sections for guiding at least one stop element (30) of the wiper arm adapter (18).

9. The wiper device at least as claimed in claim 1, characterized in that the blocking element (22) is configured at least in sections for guiding at least one stop element (30) of the wiper arm adapter (18).

10. A wiper comprising at least one wiper device (10) as claimed in claim 1.

11. The wiper device as claimed in claim 1, wherein the at least one direction (72) is a longitudinal direction along the wiper device and is configured to be parallel to a window to be wiped.

12. A wiper device comprising a wiper blade adapter (12) which has at least one first wiper blade adapter element (14)

and at least one second wiper blade adapter element (16), which, in at least one mounted state, is mounted so as to be pivotable relative to the at least one first wiper blade adapter element (14), and comprising a wiper arm adapter (18) which, in the mounted state, is coupled to the at least one second wiper blade adapter element (16), characterized in that the wiper blade adapter (12) has a securing unit (20) which is configured to permit removal of the wiper arm adapter (18) from the wiper blade adapter (12) exclusively in at least one removal pivoted position of the wiper arm adapter (18) relative to the at last one first wiper blade adapter element (14), wherein the at least one second wiper blade adapter element (16) has at least one removal slotted guide mechanism (28) which, in the removal pivoted position, is configured at least in sections for guiding at least one stop element (30) of the wiper arm adapter (18).

13. A wiper device comprising a wiper blade adapter (12) which has at least one first wiper blade adapter element (14) and at least one second wiper blade adapter element (16), which, in at least one mounted state, is mounted so as to be pivotable relative to the at least one first wiper blade adapter element (14), and comprising a wiper arm adapter (18) which, in the mounted state, is coupled to the at least one second wiper blade adapter element (16), characterized in that the wiper blade adapter (12) has a securing unit (20) which is configured to permit removal of the wiper arm adapter (18) from the wiper blade adapter (12) exclusively in at least one removal pivoted position of the wiper arm adapter (18) relative to the at least one first wiper blade adapter element (14), wherein the wiper blade adapter (12) further includes at least one mounting slotted guide mechanism (34) which is at least partially formed by the at least one second wiper blade adapter element (16) and which is configured at least in sections for guiding at least one stop element (30) of the wiper arm adapter (18).

* * * * *